US009781069B2

(12) United States Patent
Hernandez et al.

(10) Patent No.: US 9,781,069 B2
(45) Date of Patent: *Oct. 3, 2017

(54) VLAN ADVERTISEMENT AND AUTOMATED CONFIGURATION

(71) Applicant: Dell Products L.P., Round Rock, TX (US)

(72) Inventors: Hendrich Hernandez, Round Rock, TX (US); Gaurav Chawla, Austin, TX (US); Robert Winter, Burnet, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,097

(22) Filed: Apr. 2, 2015

(65) Prior Publication Data

US 2015/0215266 A1 Jul. 30, 2015

Related U.S. Application Data

(63) Continuation of application No. 13/561,406, filed on Jul. 30, 2012, now Pat. No. 9,019,967.

(51) Int. Cl.
*H04L 12/24* (2006.01)
*H04L 29/12* (2006.01)
*H04L 12/46* (2006.01)
*G06Q 30/02* (2012.01)

(52) U.S. Cl.
CPC ....... *H04L 61/103* (2013.01); *G06Q 30/0262* (2013.01); *H04L 12/4675* (2013.01); *H04L 41/0816* (2013.01); *H04L 41/0856* (2013.01); *H04L 61/2596* (2013.01)

(58) Field of Classification Search
CPC ....................................................... H04L 61/103
USPC ............................................................. 370/395
See application file for complete search history.

(56) References Cited

U.S. PATENT DOCUMENTS

| 6,189,699 | B1 | 2/2001 | Weder |
| 6,515,969 | B1 | 2/2003 | Smith |
| 6,556,541 | B1 * | 4/2003 | Bare ...................... H04L 12/185 370/235 |
| 7,120,683 | B2 | 10/2006 | Huang |
| 7,286,491 | B1 | 10/2007 | Smith |
| 7,310,664 | B1 * | 12/2007 | Merchant ............ H04L 41/0886 709/220 |
| 7,724,715 | B2 | 5/2010 | Meier |
| 7,802,000 | B1 | 9/2010 | Huang et al. |

(Continued)

FOREIGN PATENT DOCUMENTS

WO  2012031487 A1  3/2012

OTHER PUBLICATIONS

Machine translated copy for Li et al, (WO 2012031487 A1), published in Mar. 2012 is attached.*
CN2011074043 claims machine translated copy.*

*Primary Examiner* — Parth Patel
(74) *Attorney, Agent, or Firm* — Terrile, Cannatti, Chambers & Holland, LLP; Robert W. Holland

(57) ABSTRACT

A gratuitous address resolution protocol frame is sent from an information handling system upon detection of VLAN status change the information handling system. A status flag included in the address resolution protocol frame provides a switch that receives the frame with the status change, such as the addition or removal of a VLAN at the information handling system.

17 Claims, 3 Drawing Sheets

(56) References Cited

U.S. PATENT DOCUMENTS

| | | | |
|---|---|---|---|
| 8,064,469 B2 | 11/2011 | Webster | |
| 9,019,967 B2* | 4/2015 | Hernandez | H04L 61/103 370/390 |
| 2001/0030972 A1* | 10/2001 | Donaghey | H04L 45/10 370/409 |
| 2002/0046271 A1* | 4/2002 | Huang | H04L 45/00 709/223 |
| 2003/0120763 A1* | 6/2003 | Volpano | H04L 12/4641 709/223 |
| 2003/0145118 A1* | 7/2003 | Volpano | H04L 9/3242 709/249 |
| 2003/0165140 A1 | 9/2003 | Tang et al. | |
| 2003/0189905 A1* | 10/2003 | Lee | H04L 12/467 370/254 |
| 2004/0006688 A1 | 1/2004 | Pike et al. | |
| 2004/0179546 A1 | 9/2004 | McDaniel et al. | |
| 2005/0066060 A1* | 3/2005 | Pinkerton | H04L 12/4641 709/249 |
| 2005/0111455 A1 | 5/2005 | Nozue et al. | |
| 2006/0023718 A1* | 2/2006 | Joly | H04L 45/245 370/392 |
| 2006/0104308 A1 | 5/2006 | Pinkerton et al. | |
| 2006/0171303 A1 | 8/2006 | Kashyap | |
| 2007/0022211 A1* | 1/2007 | Shimizu | H04L 29/12028 709/238 |
| 2007/0110068 A1* | 5/2007 | Sekiguchi | H04L 29/12028 370/392 |
| 2007/0140263 A1 | 6/2007 | Mitome et al. | |
| 2007/0263554 A1 | 11/2007 | Finn | |
| 2007/0274234 A1* | 11/2007 | Kubota | H04L 41/0853 370/254 |
| 2008/0019365 A1 | 1/2008 | Tripathi et al. | |
| 2008/0071961 A1* | 3/2008 | Higuchi | G06F 11/2017 710/312 |
| 2008/0250139 A1 | 10/2008 | Markos et al. | |
| 2008/0304498 A1 | 12/2008 | Jorgensen et al. | |
| 2008/0307078 A1 | 12/2008 | McDaniel et al. | |
| 2008/0310416 A1 | 12/2008 | Nozue et al. | |
| 2009/0073875 A1 | 3/2009 | Kashyap | |
| 2009/0154471 A1 | 6/2009 | Kim et al. | |
| 2009/0254649 A1* | 10/2009 | Coffey | H04L 29/12264 709/224 |
| 2010/0135313 A1* | 6/2010 | Davis | H04L 45/00 370/419 |
| 2010/0220656 A1 | 9/2010 | Ramankutty et al. | |
| 2010/0290445 A1* | 11/2010 | Ankaiah | H04L 12/4633 370/338 |
| 2010/0290446 A1* | 11/2010 | Atreya | H04L 12/4633 370/338 |
| 2010/0290465 A1* | 11/2010 | Ankaiah | H04L 12/4633 370/390 |
| 2010/0322237 A1* | 12/2010 | Raja | H04L 63/1433 370/389 |
| 2011/0069622 A1* | 3/2011 | Gintis | H04L 12/2697 370/251 |
| 2011/0078181 A1* | 3/2011 | Mitsumori | H04L 12/4641 707/769 |
| 2011/0317700 A1 | 12/2011 | Assarpour | |
| 2012/0033541 A1* | 2/2012 | Jacob Da Silva | H04L 45/245 370/217 |
| 2012/0033678 A1* | 2/2012 | Page | H04L 45/28 370/401 |
| 2012/0163388 A1 | 6/2012 | Goel et al. | |
| 2012/0173870 A1* | 7/2012 | Reddy | H04L 63/0428 713/153 |
| 2012/0177047 A1* | 7/2012 | Roitshtein | H04L 69/22 370/392 |
| 2012/0182866 A1* | 7/2012 | Vinayagam | H04L 45/245 370/228 |
| 2012/0195318 A1* | 8/2012 | Numata | H04L 41/0856 370/392 |
| 2012/0290764 A1 | 11/2012 | Higuchi et al. | |
| 2013/0007848 A1 | 1/2013 | Chaskar et al. | |
| 2013/0254359 A1 | 9/2013 | Boutros et al. | |
| 2013/0282867 A1* | 10/2013 | Otake | H04L 12/4641 709/217 |
| 2013/0294451 A1* | 11/2013 | Li | H04L 45/66 370/392 |
| 2013/0301413 A1 | 11/2013 | Moen et al. | |
| 2014/0016461 A1* | 1/2014 | Ishikawa | H04L 47/17 370/230 |

* cited by examiner

VLAN ADVERTISEMENT AND AUTOMATED CONFIGURATION

CONTINUING DATA

This application is a continuation of co-pending application Ser. No. 13/561,406, filed Jul. 30, 2012, which is incorporated herein by reference in its entirety.

BACKGROUND OF THE INVENTION

Field of the Invention

The present invention relates in general to the field of information handling system virtual machines, and more particularly to virtual local area network (VLAN) advertisement and automated configuration at an information handling system network.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In order to more efficiently use processing resources of information handling systems, enterprises sometimes configure the information handling systems to run virtual machines. For example, a single server information handling system runs a host operating system, such as a hypervisor, over which multiple virtual machines execute as independent systems with each virtual machine having its own operating system. Efficiencies result from the sharing of physical processing resources by multiple virtual information handling systems where physical processing resources are allocated to virtual machines as the virtual machines need the resources. By networking multiple server information handling systems with each other, virtual machines can migrate between server information handling systems to level the utilization of the physical resources provide by the server information handling systems. A virtual machine manager (VMM) or similar application typically manages the allocation of physical resources to virtual machines.

Virtual local area networks (VLANs) are sometimes used to support communications between virtual machines and physical network resources. VLANs define a network that behaves as if physically connected to the same wire even if different endpoints are on different LANs. VLANs allow movement of virtual machines to different physical resources with software-based configurations. VLANs are configurable in the host server information handling system operating system so that a server port can be a member of multiple VLANs, such as when a server information handling system runs a hypervisor with multiple virtual machines supported by one or more VLANs. Configuration of VLANs at an operating system can present a complex problem for information technology professionals. A limited number (4096) of VLANs are typically available for allocation and network administrators typically must configure VLAN settings on a per device basis so that VLAN assignments are consistent across the network. Inconsistencies in the VLAN settings can lead to security weaknesses in the L2 network infrastructure.

To aid in the configuration of VLANs across a L2 switched network, the I.E.E.E. developed the 802.1ak Generic VLAN Registration Protocol (GVRP) and a related encapsulating Generic Attribute Registration Protocol (GARP). Although GVRP was intended to provide for automated configuration of VLANs across a L2 switched network, it does not deploy consistently in networked devices and is not implemented by most host operating systems or network interface card (NIC) drivers. For example, Linux, Windows and VMWare will usually send GARP requests for VLAN IDs at boot and when VLANs are created, but not at VLAN removal. Host operating systems can include the ability to manually configure VLANs, however, manual configuration of VLANs through a host hypervisor can present a tedious and time consuming task of ensuring consistent configuration across multiple administration domains, namely network and server domains.

SUMMARY OF THE INVENTION

Therefore a need has arisen for a system and method which provides a host-based solution to advertise a VLAN to a network resource for automated learning of the VLAN by the network resource.

In accordance with the present invention, a system and method are provided which substantially reduce the disadvantages and problems associated with previous methods and systems for configuration of a VLAN at a host information handling system operating system. A host information handling system advertises a management function associated with a VLAN by issuing a gratuitous address resolution protocol frame having an identifier for the VLAN and a function identifier that identifies the management function, such as an add flag when a VLAN is added and a remove flag when a VLAN is removed.

More specifically, a server information handling system processes information with processing components, such as a CPU and memory, that execute instructions, such as a host operating system that acts as a hypervisor to support plural virtual machines. The host operating system includes a VLAN driver to manage VLANs used by the virtual machines, such as adding and removing a VLAN. The host operating system communicates with a network through a switch, such as an I/O module. The switch tracks VLANs with a VLAN table so that external devices can interface through the network with virtual machines using VLAN identifiers. In order to keep the VLAN table of the switch up to date, a VLAN advertiser associated with the VLAN driver issues gratuitous address resolution protocol frames at predetermined management functions performed by the VLAN driver, such as the addition or removal of a VLAN. For example, a field of a gratuitous address resolution protocol frame includes a flag when the state of a VLAN changes so that an update is made to the VLAN table of the switch. If, for example, a VLAN supported by the host operating system is removed, the VLAN advertiser issues a gratuitous address resolution protocol frame having a VLAN identifier and a remove flag so that the switch removes the VLAN with the identifier from the VLAN table.

The present invention provides a number of important technical advantages. One example of an important technical advantage is that automated learning of a VLAN by a switch interfaced with a host information handling system alleviates the tedious task of manually configuring VLANs between network and server domains. The host-based advertisement mechanism provides consistent and robust VLAN auto-learning, which provides automated configuration of chassis-based I/O module configurations in the adjacent bridge configurations. A comprehensive and reliable gratuitous address resolution packet ("Gratuitous-ARP") advertises VLAN identifiers at relevant times defined through the host, such as boot, runtime when VLANs are created and removed and at link state changes. Sending a Gratuitous-ARP from a host operating system allows automatic and dynamic VLAN configuration without administrator involvement, resulting in simplified network administration.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Sending a gratuitous address resolution protocol frame from an information handling system upon a change in status of a VLAN with an indication of the changed status provides an update of the status to a switch interfaced with the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
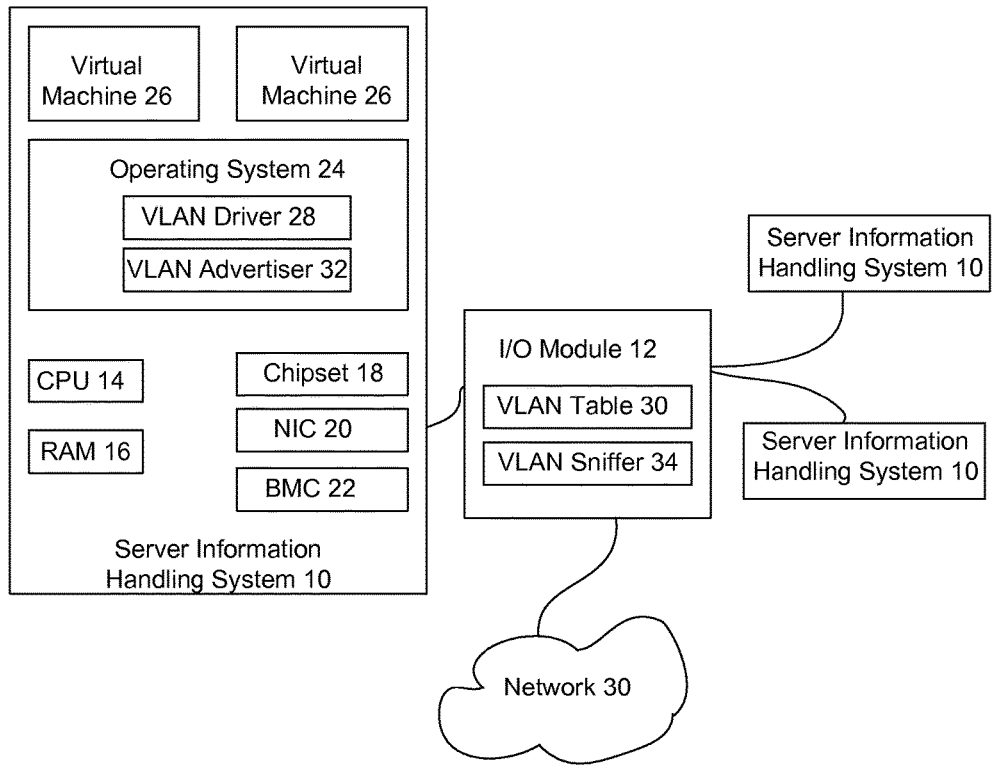
FIG. 1 depicts a block diagram of information handling systems interfaced through an I/O module that tracks VLANs with gratuitous address resolution protocol frames having a status flag.

Referring now to FIG. 1, a block diagram depicts information handling systems 10 interfaced through an I/O module 12 that tracks VLANs with gratuitous address resolution protocol frames having a status flag. Information handling systems 10 process information with processing components, such as a CPU 14, RAM 16 and chipset 18, and communicate the information with one or more network interface cards (NICs) 20 interfaced with I/O module 12. A base board management controller (BMC) 22 interfaces with chipset 18 and I/O module 12 to perform system management functions, such as remote power up and power down commands received from a remote location. I/O module 12 is, for example, a chassis-based switch or bridge device that coordinates a network interface between plural information handling systems 10 disposed in a common chassis and an external network, such as a local area network or more generally the Internet.

In the example embodiment depicted by FIG. 1, information handling system 10 has a hypervisor operating system 24 that supports operation of plural virtual machines 26. Virtual machines 26 communicate with each other and with external network locations using virtual local area networks (VLANs). A VLAN driver 28 of operating system 24 manages the use of VLANs at information handling system 10 by maintaining table of the VLANs by VLAN identifiers to that communications to VLANs are provided to an appropriate physical resource. For example, during runtime operating system 24 adds and removes VLANs as needed to support virtual machines 26 or for other purposes. VLAN states may also change in response to changes at physical resources, such as a link state change that might occur when a cable is plugged in or plugged out.

To ensure that I/O module 12 or switch devices of network 30 maintain VLAN table 30 synchronized with the VLANs managed by VLAN driver 28, a VLAN advertiser 32 issues gratuitous address resolution protocol frames upon detecting a change in state of a VLAN managed by VLAN driver 28. For example, a gratuitous address resolution protocol frame is issued by VLAN advertiser at boot time and during runtime when a link state change is detected or a VLAN is created or removed. The gratuitous address resolution protocol frame is defined to include the VLAN Tag per IP interface and also includes a status flag that indicates VLAN addition or removal. VLAN advertiser 32 running as part of operating system 24 sends a gratuitous address resolution protocol frame per VLAN identifier at operating system boot, at a vMotion or other migration operation, at VLAN creation, at VLAN deletion to show remaining VLANs or no VLANs and at link state change when a link is up or down. In each instance, VLAN advertiser 32 sends the gratuitous address resolution protocol frame three times in a one second time period.

I/O module 12 or other switching devices interfaced with information handling system 10 receives the gratuitous address resolution protocol frame an uses information in the frame to learn the MAC address, VLAN identifier, port number and other relevant information in the frame for the VLAN effected by the state change. Gratuitous address resolution protocol frames with a status flag provide an update to external switch for all IP bound VLANs, which covers most cases for local area network traffic, however, non-IP traffic will not be covered, such as Fibre Channel over Ethernet (FCoE), RDMA over Converged Ethernet (RoCE) VLANs and untagged VLANs sent via an access port between information handling system 10 and I/O module 12. To track server-initiated VLANs, a VLAN sniffer 34 executing on I/O module 12 analyzes non-IP packets sent from information handling system 10 to detect VLANs. For example, for FCoE, VLANs are learned by VLAN sniffer 34 as part of the FCoE Initialization Protocol (FIP). FIP defines centralized configuration of FCoE VLANs and are communicated to end points via FIP frames. VLAN sniffer 34 snoops the FIP frame to learn of FCoE VLANs with FCoE FIP VLAN Discovery Request and Notification messages. Server initiated mechanisms, such as FCoE, can rely upon VLAN sniffer 34 to maintain VLAN table 30 so that inbound responses to a server initiated event will have an up-to-date VLAN map.

Figure 2:
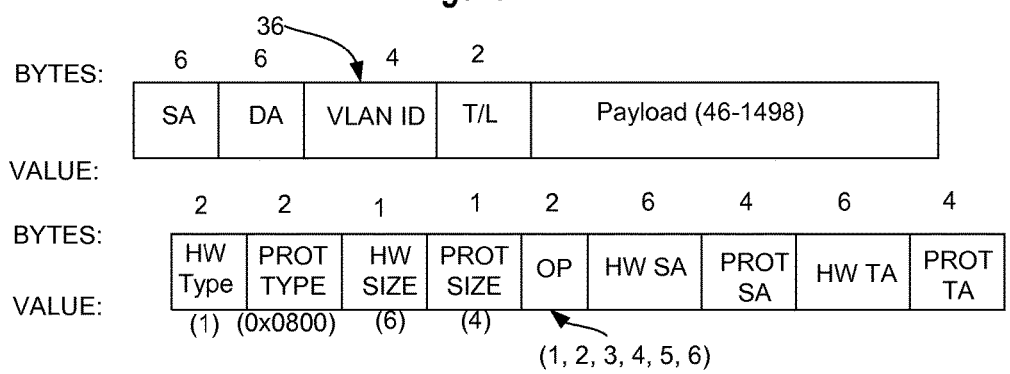
FIG. 2 depicts a portion of a gratuitous address resolution protocol frame having a status field.

Referring now to FIG. 2, a portion of a gratuitous address resolution protocol frame 36 is depicted having a status field 38. The gratuitous address resolution protocol frame 36 has and sending address equal to a destination address such as is defined by I.E.E.E. 802.1Q. In the example embodiment of FIG. 2, the depicted values support an address resolution protocol packet over Ethernet and IP. Existing operational codes (OP) are: ARP request=1; ARP reply=2; RARP request=3; and RARP response=4. New values defined are a status flag that define when a VALN is added or removed: Add VLAN=5; and Remove VLAN=6. A switch that receives gratuitous address resolution protocol frame 36 extracts the flag value 5 or 6 to update VLAN table 30 for the VLAN ID, MAC address and port number of the frame.

Figure 3:
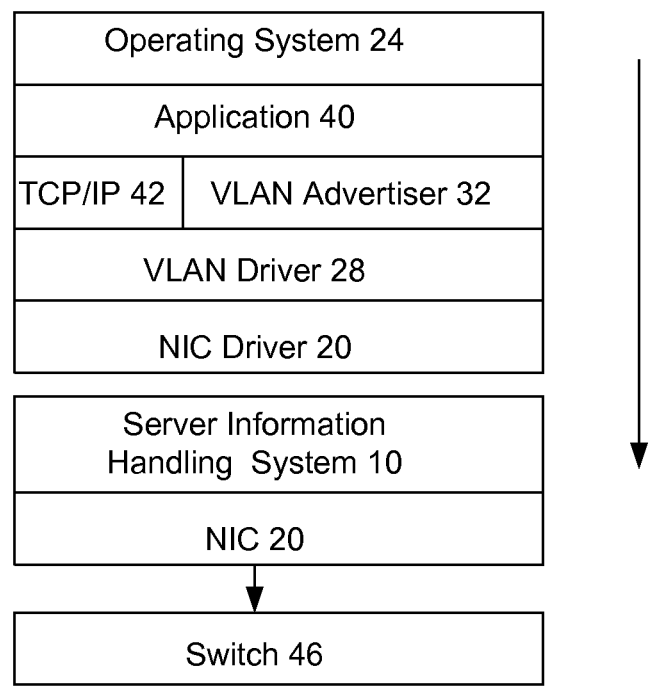
FIG. 3 depicts a block diagram of a VLAN auto-learning operating system stack.

Referring now to FIG. 3, a block diagram depicts a VLAN auto-learning operating system stack. An operating system layer 24 manages communication for applications of an application layer 40. A TCP/IP layer coordinates preparation of communicated information for communication by TCP/IP through VLAN driver 28 and NIC driver 20. VLAN advertiser 32 resides at the TCP/IP layer to prepare gratuitous address resolution protocol frames for communication by VLAN driver 28 with the status flag, such as a VLAN added or a VLAN removed flag. In one embodiment, VLAN advertiser 32 is software instructions associated with operating system 24 or VLAN driver 28; in an alternative embodiment, VLAN advertiser 32 is firmware instructions running on NIC 20. Server information handling system 10 sends the information as packets through the physical NIC 20 to a switch 46. VLANs are created by the operating system VLAN driver layer 28 based upon user configuration settings. Frames that include information associated with a VLAN are tagged with the VLAN ID that identifies the VLAN. Sending gratuitous address resolution protocol frames with the status identifier when VLAN driver 28 changes a VLAN state allows switch 46 learn updates to VLANs as the updates occur. Gratuitous address resolution protocol frames update a VLAN table of switch 46 so that the VLAN table can handle client-initiated traffic.

Figure 4:
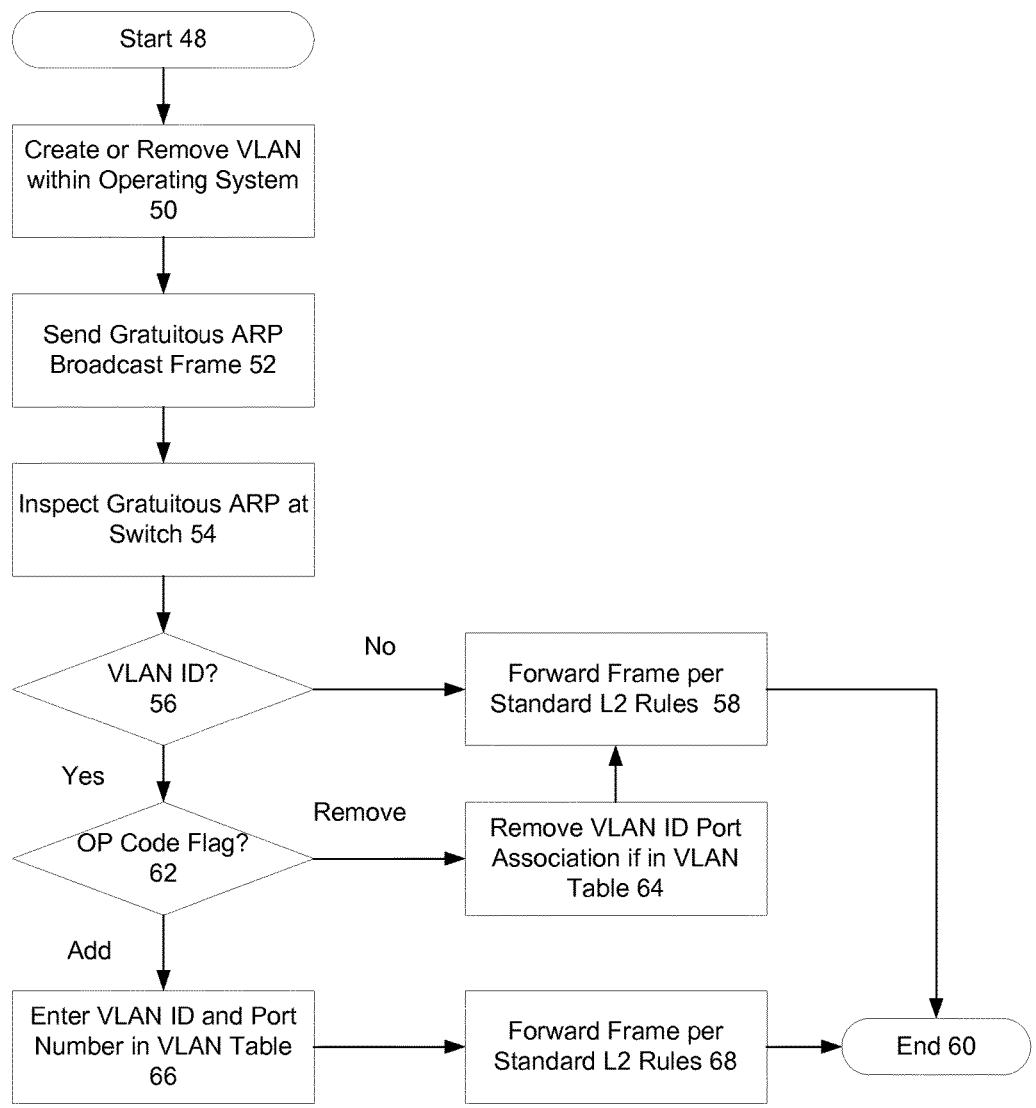
FIG. 4 depicts a flow diagram of a process for auto-learning of a VLAN status update.

Referring now to FIG. 4, a flow diagram depicts a process for auto-learning of a VLAN status update. The process starts at step 48 with monitoring of activity at a VLAN driver to detect VLAN status changes. At step 50, a VLAN is created or removed within an operating system. At step 52, a gratuitous address resolution protocol frame is sent to the network switch in response to the VLAN status change. For instance, three gratuitous address resolution protocol frames are sent in a one second time interval after VLAN creation, removal, at boot time or at a link state change, each of which changes VLAN status. At step 54, the switch receives and inspects the gratuitous address resolution protocol frame to extract the status information and VLAN identification information. At step 56, a determination is made of whether the gratuitous address resolution protocol frame includes a VLAN identifier. If not, the process continues to step 58 to forward the frame per standard L2 rules and the process ends at step 60. If the a VLAN identifier is found at step 56, the process continues to step 62 to the VLAN OP code for a status change flag, such as a VLAN added or VLAN removed flag. If a remove flag is found, the process continues to step 64 to remove the VLAN identifier port association if the VLAN is found in the switch's VLAN table, and then the process continues to step 58. If at step 62 an add flag is found, the process continues to step 66 to enter the VLAN identifier and port number in the VLAN forwarding table. The process then continues to step 68 forward the frame per standard L2 rules.

Although the present invention has been described in detail, it should be understood that various changes, substitutions and alterations can be made hereto without departing from the spirit and scope of the invention as defined by the appended claims.

What is claimed is:

1. An information handling system comprising:
one or more processors operable to process information;
memory interfaced with the one or more processors and operable to store the information;
one or more network interface cards interfaced with the processor and operable to communicate with one or more networks including at least a local area network having one or more switches communicating information with L2 switched networking that references a media access address;
an operating system stored in the memory and operable to execute on the one or more processors;
a virtual local area network (VLAN) driver stored in memory and associated with the operating system, the VLAN driver operable to perform management functions for one or VLANs for communication with the one or more networks through the one or more network interface cards; and
a VLAN advertiser interfaced with the VLAN driver, the VLAN driver operable to detect one or more of the management functions and in response to send a gratuitous address resolution protocol frame from one or more of the network interface cards, the gratuitous address resolution protocol frame having a VLAN identifier and a function identifier for the detected one or more of the management functions, the gratuitous address resolution protocol frame configured to update a VLAN table of a network device with MAC address, VLAN ID and port number information associated with the management function.

2. The information handling system of claim 1 wherein the one or more management functions is creation of a new VLAN and the function identifier is an add flag.

3. The information handling system of claim 1 wherein the one or more management functions is removal of an existing VLAN and the function identifier is a remove flag.

4. The information handling system of claim 1 further comprising a VLAN sniffer stored in memory of the network device and operable to execute on a processor of the network device to analyze detected frames to identify one or more VLANs.

5. The information handling system of claim 4 wherein the detected frames comprise Fibre Channel over Ethernet frames.

6. The information handling system of claim 1 wherein the VLAN advertiser comprises firmware instructions integrated in one or more of the network interface cards.

7. A method for advertising a VLAN of an information handling system, the method comprising:
- detecting at the information handling system of a management function associated with the VLAN;
- in response to detecting, sending a gratuitous address resolution protocol frame through a local area network from the information handling system to a switch supporting the local area network, the gratuitous address resolution protocol frame having at least an identifier of the VLAN, a media access address, a port and a management function status; and
- updating a VLAN table stored on a switch that receives the gratuitous address resolution protocol frame with the management status of the gratuitous address resolution protocol frame by reference to address information of the gratuitous address resolution protocol frame.

8. The method of claim 7 wherein sending a gratuitous address resolution protocol frame further comprises sending the gratuitous address resolution protocol frame with an operating system of the information handling system.

9. The method of claim 8 wherein the operating system comprises a hypervisor supporting plural virtual machines.

10. The method of claim 7 wherein the function comprises addition of a VLAN during runtime and the management function status comprises an add flag.

11. The method of claim 7 wherein the management function status comprises removal of a VLAN during runtime indicated by a remove flag.

12. The method of claim 7 further comprising:
- analyzing frames received at the switch from the information handling system to identify non-Internet Protocol frames;
- determining that one or more non-Internet Protocol frames has a VLAN identifier; and
- applying information from the one or more non-Internet Protocol frames to update the status stored on the switch of one or more VLANs.

13. The method of claim 12 wherein the non-Internet Protocol frame is a Fibre Channel over Ethernet frame.

14. The method of claim 7 further comprising:
- analyzing at the switch one or more frames initiated from the information handling system to determine if gratuitous address resolution protocol frames are supported by firmware of the information handling system.

15. A non-transitory machine readable medium storing instructions operable to:
- detect VLAN status changes during runtime at an information handling system;
- in response to a detected VLAN status change, send a gratuitous address resolution protocol frame from the information handling system to a local area network with a status flag that indicates the detected status change; and
- receive the gratuitous address resolution protocol frame through the local area network to maintain a VLAN table at a switch of the local area network by applying network address information of the gratuitous address resolution frame including at least L2 switched network media access address and port information and a status change function of the VLAN status change.

16. The machine readable medium of claim 15 wherein the status change comprises addition of a VLAN at the information handling system.

17. The machine readable medium of claim 15 wherein the status change comprises removal of a VLAN at the information handling system.

* * * * *